United States Patent [19]
Lalush

[11] Patent Number: 5,328,067
[45] Date of Patent: Jul. 12, 1994

[54] PASSENGER TRUCK BOAT CARRIER

[76] Inventor: Louis M. Lalush, 180 Overbrook Dr., Folsom, Calif. 95630

[21] Appl. No.: 89,882

[22] Filed: Jul. 12, 1993

[51] Int. Cl.$^5$ .............................................. B60R 7/00
[52] U.S. Cl. ............................ 224/42.45 R; 224/309; 224/325
[58] Field of Search ................ 224/42.45 R, 311, 309, 224/310, 325, 326, 314, 315, 316, 317, 318, 319, 320, 321, 322, 323, 324, 42.11

[56] References Cited

U.S. PATENT DOCUMENTS

| | | | |
|---|---|---|---|
| 2,632,619 | 3/1953 | Wilson | 224/42.45 R |
| 3,709,413 | 1/1973 | Nelson | 229/310 |
| 4,097,958 | 7/1978 | Van Dell | 16/128.1 |
| 4,415,194 | 11/1983 | Bauer | 296/56 |
| 5,029,785 | 7/1991 | Besong, Jr. | 224/42.45 R |

Primary Examiner—Henry J. Recla
Assistant Examiner—David J. Walczak

[57] ABSTRACT

A carrier which consists of three separate frames, forward, center and rear that are of weld construction with bolt on brackets that are bolted to the truck body in concealed areas of hood and door jambs. The carrier frames are easily removed when not in use.

1 Claim, 2 Drawing Sheets

PASSENGER TRUCK BOAT CARRIER

BRIEF SUMMARY OF THE INVENTION

The invention relates in general to a carrier mounted on to a passenger truck for the purpose of transporting a boat. The carrier is constructed to be rigid in design with concealed bolted attachments to motor vehicle body framework. This carrier may be easily installed as well as disassembled when not in use.

The advantage of this invention is the strength with use of standard round pipe in the construction of this type of frame. In addition, the carrier can also be adaptable for other uses such as large sized luggage containers, transporting building materials of medium weight and length, but primary purpose is to transport an aluminum constructed pleasure boat.

BACKGROUND OF THE INVENTION

This invention relates to the fact that I have used this concept of structural assembly with similar brackets for over the past ten years with excellent results with over seven thousand miles of usage without problems, hauling building materials occasionally.

DESCRIPTION OF THE DRAWINGS

Figure 1:
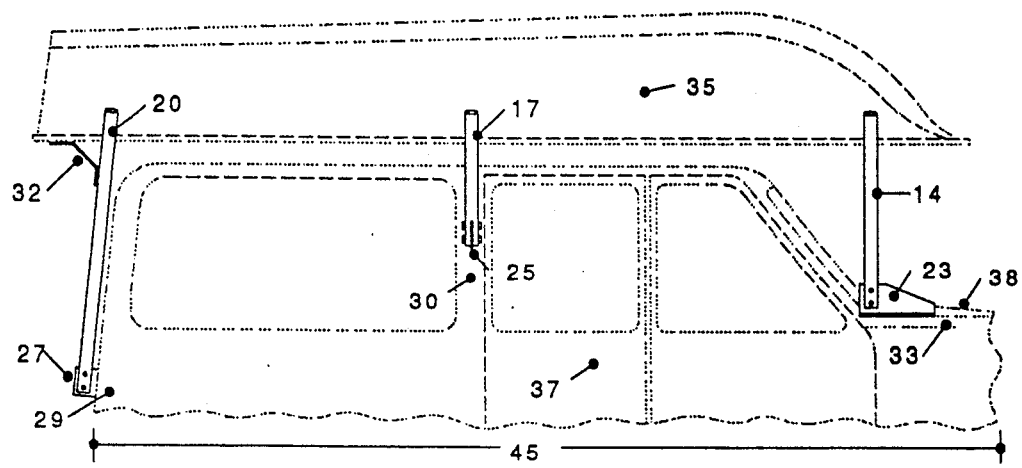
FIG. 1 is a side view of a boat carrier mounted on a passenger vehicle.
Figure 5:
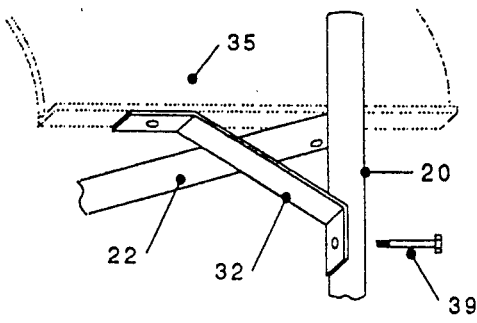
FIG. 5 is an enlarged fragmentary perspective view of the rear carrier frame with a reinforcing brace.

Referring to FIG. 1, a view of the right side of a truck 45 is shown with attached carrier frames designed to carry a boat 35. The carrier consists of three boat carrying frames. The upright tubular pipe 14 is a portion of the forward boat carrying frame. Upright pipe 14 is fastened with bolts 39 to bracket 23. The upright pipe 17 is a portion of the center boat carrying frame. Upright pipe 17 is fastened with bolts 39 to bracket 25. Upright pipe 20 is a portion of the rear boat carrying frame, and is fastened with bolts 39 to bracket 27. The upper portion of pipe 20 is fastened with a bolt 39 to bracket 32 with upper portion of bracket 32 fastened with a bolt 39 to boat 35, as also shown in FIG. 5.

Figure 4:
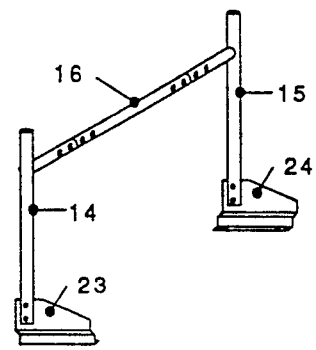
FIG. 4 is a perspective view of the front carrier frame with mounting brackets.

Referring to FIG. 4 is a perspective view of both sides of the forward carrier frame. Upright pipe 15 is on the left side of truck 45. Pipe 15 is fastened with bolts 39 to bracket 24.

Figure 3:
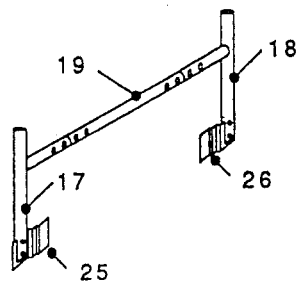
FIG. 3 is a perspective view of the center carrier frame with mounting brackets.

Referring to FIG. 3 is a prospective view of both sides of the center carrier frame. Upright pipe 18 is on the left side of the truck 45. Pipe 18 is fastened with bolts 39 to bracket 26.

Figure 2:
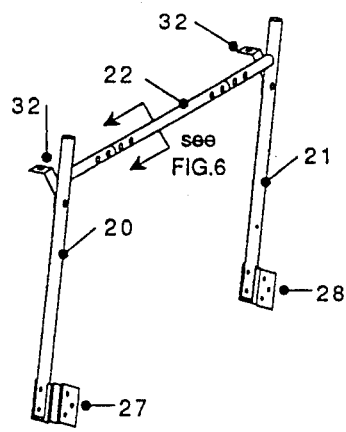
FIG. 2 is a perspective view of the rear carrier frame with mounting brackets.

Referring to FIG. 2 is a perspective view of both sides of the rear carrier frame. Upright pipe 21 is on the left side of the truck 45. Pipe 21 is fastened with bolts 39 to bracket 28. The upper portion of pipe 21 is fastened with bolt 39 to bracket 32 with upper portion of bracket 32 fastened with a bolt 39 to boat 35.

In FIG. 4 upright pipe 14 is joined to horizontal pipe 16 by welding. The opposite end of pipe 16 is joined to pipe 15 by welding, creating an integral frame. In FIG. 3 upright pipe 17 is joined to horizontal pipe 19 by welding. The opposite end of pipe 19 is joined to pipe 18 by welding, creating an integral frame.

In FIG. 2 upright pipe 20 is joined to horizontal pipe 22 by welding. The opposite end of pipe 22 is joined to pipe 21 by welding, creating an integral frame.

Figure 6:
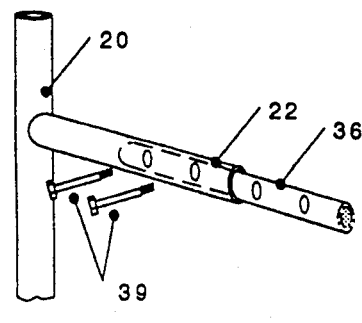
FIG. 6 is an enlarged perspective view of a spliced connection for the carriers.

To facilitate smaller packaging for shipment from manufacturer to buyer, the welded carrier frame can be cut and spliced as shown in FIG. 6. The splice is accomplished by inserting tubular pipe 36 with holes to match tubular pipe 22 to accommodate four bolts 39 to rejoin pipe 22 accomplishing again a complete sturdy carrier frame. The same splicing method is used on carrier frame in FIG. 3 and carrier frame in FIG. 4, creating a total of six splices.

Figure 8:
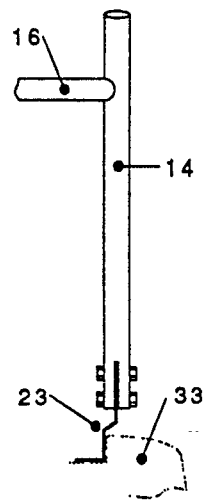
FIG. 8 is a fragmentary enlarged view of the front carrier position to the side of the front fender.

Referring to FIG. 8 is a rear view of bracket 23 in relation to right front fender 33.

Figure 7:
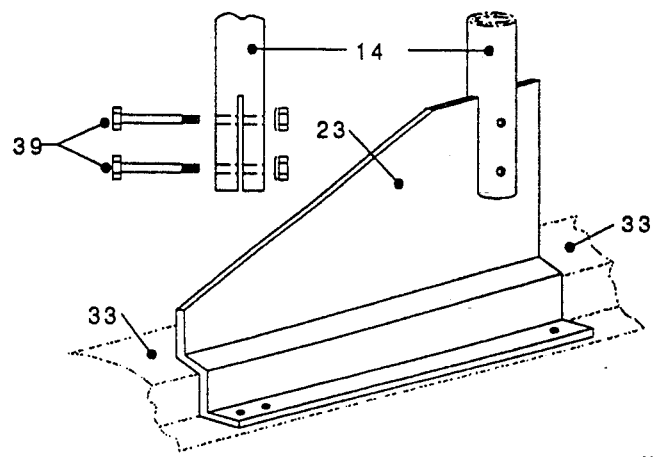
FIG. 7 is an enlarged fragmentary perspective view of a bracket on the front carrier frame attached to front fender.

Bracket 23 is more clearly shown in an exploded perspective view FIG. 7. Bracket 23 is formed to accommodate fastening with bolts 39 to concealed flange on fender 33, beneath the closure area of truck hood 38 shown in FIG. 1 and fender 33 flange, FIG. 7 shows the slotted area of pipe 14 that bolts 39 onto upper part of bracket 23. The same procedure is used for attachments of bracket 24 on the left side of the truck 45, as was used for bracket 23.

Figure 10:
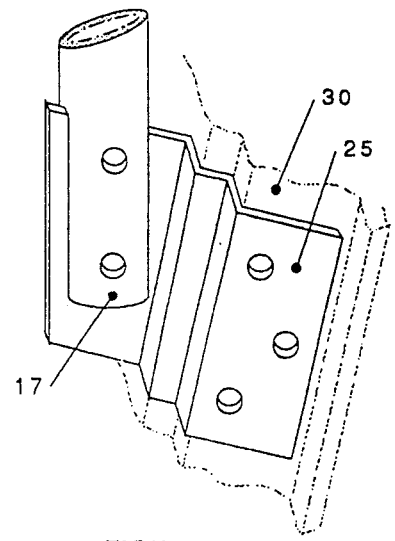
FIG. 10 is a fragmentary enlarged perspective view of the center carrier bracket fastened to the right side of truck.
Figure 11:
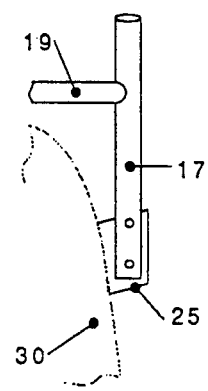
FIG. 11 is an enlarged rear view of the center carrier frame to position of right side of truck.
Figure 14:
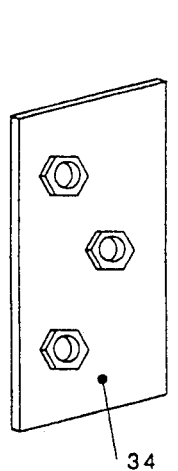
FIG. 14 is a view of a back-up plate with bolt nuts.

Referring to FIG. 11, is a rear view of the center carrier frame to the right side of truck 45, which is more easily viewed in exploded perspective view FIG. 10 showing bracket 25 with bolt 39 attachment area of door jamb 30. Referring to FIG. 14, which is a back-up plate with welded nuts to be installed behind the area of door jamb 30 fastened with bolts 39 passing through bracket 25 then passing through door jamb 30 into back-up plate 34.

Figure 12:
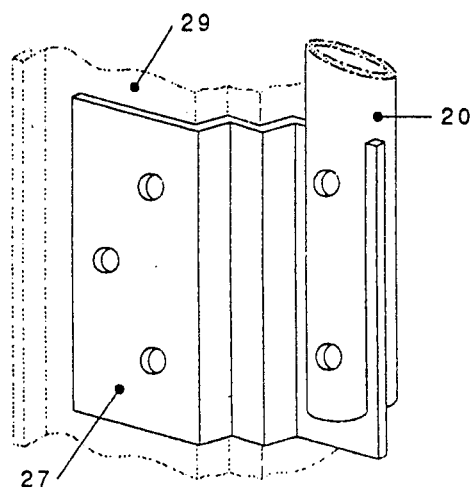
FIG. 12 is a fragmentary enlarged perspective view of rear carrier frame attached to rear right side of truck.
Figure 13:
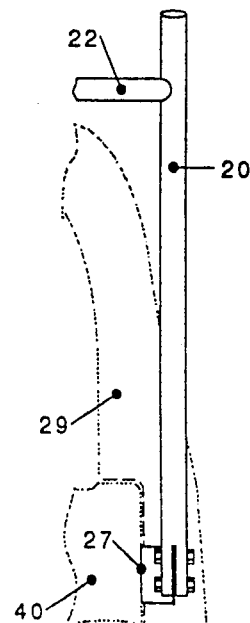
FIG. 13 is a rear view of rear carrier frame fastened to rear right side of truck.

Referring to FIG. 13, is a rear view of the rear carrier frame to the rear right side of truck 45, which is more easily viewed in exploded perspective view FIG. 12 showing bracket 27 with bolt 39 attachment area of door jamb 29. Referring to FIG. 14, which is a back-up plate with welded nuts to be installed behind area of door jamb 29, fastened with bolts 39 passing through bracket 27 passing through door jamb 29 into back-up plate 34. The same procedure is used for attachment of rear carrier frame to the rear left side of truck 45.

Figure 15:
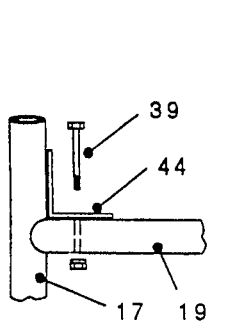
FIG. 15 is a fragmentary enlarged view of a metal angle secured to the center frame.

Referring to FIG. 15 is a partial front view of the center carrier frame showing a metal angle 44 with a bolt 39 that is fastened to horizontal bar 19 of center carrier frame. When the boat is not attached a continuous angle 44 is fastened with bolts 39 to the frames shown in FIG. 2, FIG. 3, and FIG. 4 on both the right side and left side to form an integral unit to be used as a carrier for a large luggage container or medium weight and length of building materials or other miscellaneous items of medium weight and length. In FIG. 7 showing the slotted area of pipe 14 that bolts 39 onto bracket 23, the same concept of slotting is done on the other bottom ends of upright pipes 21, 17, 18, 14 and 15 shown in FIGS. 2, 3, and 4.

Figure 9:
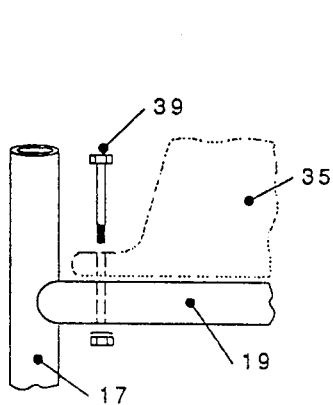
FIG. 9 is a fragmentary enlarged view of a boat fastened to the center carrier frame.

Referring to FIG. 9 is a fragmentary front view of the center carrier frame FIG. 3 showing a boat 35 fastened with bolt 39 atop horizontal pipe 19 of right side of center carrier frame and the same securing method is applied to secure boat to left side of center carrier frame.

Having thus described my invention I claim:

1. An article carrier frame adapted to be mounted on a vehicle having a pair of front fenders each having a flange thereon concealed by a vehicle hood when said hood is in a closed position, first and second door jambs which are concealed by respective first and second vehicle doors when said doors are in a closed position and a rear door jamb which is concealed by a rear door when said rear door is in a closed position, comprising:

a forward carrier frame having a first forward upright member having first and second end portions and a second forward upright member having first and second end portions, a first forward mounting bracket connected to said first end portion of said first forward upright member, a second forward mounting bracket connected to said first end portion of said second forward upright member and a forward horizontal member connecting said second end portions of said first and second forward upright members wherein said first forward mounting bracket is mounted to one of said flanges with a first forward mounting means and said second forward mounting bracket is mounted to the other of said flanges with a second forward mounting means such that when said forward frame is mounted to said vehicle, said first and second forward mounting means are concealed by said vehicle hood when said hood is in said closed position;

a central carrier frame having a first central upright member having first and second end portions and a second central upright member having first and second end portions, a first central mounting bracket connected to said first end portion of said first central upright member, a second central mounting bracket connected to said first end portion of said second central upright member and a central horizontal member connecting said second end portions of said first and second central upright members wherein said first central mounting bracket is mounted to said first door jamb with a first central mounting means and said second central mounting bracket is mounted to said second door jamb with a second central mounting means such that when said central carrier frame is mounted to said vehicle, said first and second central mounting means are respectively concealed by said first and second vehicle doors when said first and second doors are in said closed position; and a rear carrier frame having a first rear upright member having first and second end portions and a second rear upright member having first and second end portions, a first rear mounting bracket connected to said first end portion of said first rear upright member, a second rear mounting bracket connected to said first end portion of said second rear upright member and a rear horizontal member connecting said second end portions of said first and second rear upright members wherein said first and second rear mounting brackets are mounted to said rear door jamb with respective first and second rear mounting means such that when said rear carrier frame is mounted to said vehicle, said first and second rear mounting means are concealed by said rear door when said rear door is in said closed position whereby an article to be carried on said carrier frame extends over and is secured to at least two of said horizontal members and is thereby carried by said frame.

* * * * *